(12) United States Patent
Xu et al.

(10) Patent No.: US 11,641,293 B1
(45) Date of Patent: May 2, 2023

(54) SYSTEMS AND METHOD FOR DISTORTION COMPENSATION

(71) Applicant: CABLE TELEVISION LABORATORIES, INC., Louisville, CO (US)

(72) Inventors: Mu Xu, Broomfield, CO (US);
Zhensheng Jia, Superior, CO (US);
Junwen Zhang, Shanghai (CN);
Haipeng Zhang, Broomfield, CO (US);
Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 124 days.

(21) Appl. No.: 17/228,643

(22) Filed: Apr. 12, 2021

Related U.S. Application Data (60) Provisional application No. 63/008,325, filed on Apr. 10, 2020.

(51) Int. Cl.
 *H04L 25/03* (2006.01)

(52) U.S. Cl.
 CPC .. *H04L 25/03859* (2013.01); *H04L 25/03847* (2013.01); *H04L 25/03872* (2013.01)

(58) Field of Classification Search
 CPC ....... H04B 3/30; H04B 3/32; H04L 25/03828; H04L 25/03847; H04L 25/03859; H04L 25/03872; H04L 25/03968; H04L 25/085
 USPC ........ 375/257, 284, 285, 295, 340, 341, 346
 See application file for complete search history.

(56) References Cited

U.S. PATENT DOCUMENTS

| | | | | |
|---|---|---|---|---|
| 9,692,521 | B1* | 6/2017 | Zhou | H04B 10/532 |
| 2005/0129138 | A1* | 6/2005 | Vaananen | H04L 27/34 |
| | | | | 375/295 |
| 2006/0067440 | A1* | 3/2006 | Hsu | H03F 1/3241 |
| | | | | 375/345 |
| 2013/0071119 | A1* | 3/2013 | Liu | H04B 10/516 |
| | | | | 398/159 |
| 2015/0244402 | A1* | 8/2015 | Ghannouchi | H04L 27/08 |
| | | | | 375/297 |
| 2018/0219578 | A1* | 8/2018 | Giraldo | H04L 27/0014 |

\* cited by examiner

*Primary Examiner* — Young T. Tse
(74) *Attorney, Agent, or Firm* — Lathrop GPM LLP (57) ABSTRACT

A method and apparatus of distortion compensation during data transmission uses an interweaved look-up table (ILUT) to mitigate residual signal distortions in a signal transmitted over a transmission link. The ILUT interweaves states across both an I and a Q tributary to calculate mean error and an extended symbol basis. As a result, the method works particularly well against two-dimensional distortions like nonlinearity, IQ-imbalance, and quadrature error. The method may be used for either pre-compensation when it is combined with k-means clustering in a transmitter or post-compensation when it is combined with maximum likelihood (ML) detection in a receiver.

20 Claims, 7 Drawing Sheets

SYSTEMS AND METHOD FOR DISTORTION COMPENSATION

CROSS-REFERENCE TO RELATED APPLICATIONS

This application claims priority to U.S. Provisional Application No. 63/008,325 filed Apr. 10, 2020 and titled "Method of Interweaved Look-Up Table for Signal Distortion Compensation in Coherent Systems," hereby incorporated by reference in its entirety.

BACKGROUND

Increasing the quantity of data that may be transmitted over a communication networks is an ongoing effort. To fuel the development of future ultra-high-speed optical transport and access technology, higher-order modulation formats are an indispensable technology. These formats bring about higher-spectral efficiency and lower power consumption per bit. However, demodulating ultra-high baud rate (ultra-HB) higher-order (HO) quadrature amplitude modulation (UHH-QAM) in coherent systems may experience a number of challenges. In one aspect, because of an increased density of constellation points, HB-HO-QAM may be sensitive toward channel penalties such as intensity noise, phase noise, inter-symbol interference (ISI), and nonlinear distortions. In another aspect, HB-HO-QAM also suffers more from imperfections of the system, such as the skew, timing offset, imbalance between in-phase (I) and quadrature (Q) components, and quadrature error. Therefore, transmitters using high speed coherent modules will be strictly calibrated before use and this strict standard may significantly reduce the product yield rate. Moreover, the matured signal recovery DSP (Digital Signal Processing) in a receiver is less effective with higher-order QAM. For example, in modulation formats such as 64-QAM and 256-QAM, skews and nonlinearities become harder to be eliminate completely as compared with simpler modulation formats like QPSK. This results in stronger residual distortions and heavier penalties on signal quality. A way to address distortions in a higher order QAM system includes pre-distorting the signal to absorb the accumulated residual signal distortions at various steps in a HB-HO-QAM coherent transmission system.

SUMMARY OF THE EMBODIMENTS

In a first aspect, a method of compensating for signal distortion in a data transmission payload sent over a transmission link includes receiving a sequence of training symbols $S_i$; decomposing each symbol $S_i$ into real-valued in-phase $I_i$ and quadrature $Q_i$ components; composing symbol chips $c_{Ii}$ and $c_{Qi}$ from n consecutive symbols, wherein $c_{Ii}$ comprises n $I_i$ components and at least one $Q_i$ component, and wherein $c_{Qi}$ comprises n $Q_i$ components and at least one $I_i$ component; storing symbol chips $c_{Ii}$ in an I branch array and symbol chips $c_{Qi}$ in a Q branch array; processing the I branch array and Q branch array symbol chips to calculate an input-output data map; and performing signal compensation of a data transmission payload using the input-output data map.

In a further embodiment, $c_{Ii}=[I_{i-(n-1)/2}, \ldots, I_i, \ldots, I_{i+(n-1)/2}, Q_i]$, $c_{Qi}=[Q_{i-(n-1)/2}, \ldots, Q_i, \ldots, Q_{i+(n-1)/2}, I_i]$ and n is an odd integer.

In any of the above embodiments, n=3.

In another embodiment, the input-output data map comprises an interweaved look-up table (ILUT) comprising an I look-up table (LUT) and a Q LUT;

In any of the above embodiments, the transmission link uses dual polarization, I and Q denote orthogonal phases and X and Y denote orthogonal polarizations, and wherein the ILUT comprises an XI LUT, an XQ LUT, a YI LUT and a YQ LUT.

In any of the above embodiments, symbol chips are composed from n consecutive symbols, wherein
$c_{XI}=[XI_{i-(n-1)/2}, \ldots, XI_i, \ldots, XI_{i+(n-1)/2}, XQ_i]$,
$c_{XQ}=[XQ_{i-(n-1)/2}, \ldots, XQ_i, \ldots, XQ_{i+(n-1)/2}, XI_i]$,
$c_{YI}=[YI_{i-(n-1)/2}, \ldots, YI_i, \ldots, YI_{i+(n-1)/2}, YQ_i]$ and
$c_{YQ}=[YQ_{i-(n-1)/2}, \ldots, YQ_i, \ldots, YQ_{i+(n-1)/2}, YI_i]$.

In any of the above embodiments, processing the symbol chips further comprises, for each of the I and Q branches classifying symbol chips of a respective branch array into one of a plurality of clusters $C_k$, each cluster comprising all symbol chips with a minimal Euclidean distance to a kth extended symbol basis; calculating a mean error for each cluster and storing it in the look-up table of the respective branch; and calculating an extended symbol basis and storing it in the look-up table of the respective branch.

In any of the above embodiments, performing signal compensation further comprises pre-compensating the data transmission payload after binary data for transmission is mapped into vector symbols by: clustering the vector symbols into different basis categories using an original-basis list from the ILUT; and pre-distorting the clustered symbols by deducing a mean error from a second symbol in each chip and a mean error from the ILUT; and forming the data transmission payload from the pre-distorted symbols.

In any of the above embodiments, performing signal compensation further comprises compensating for signal distortion in a decision stage of a receiver by composing received symbols into arrays of symbol chips; and applying a maximum likelihood detection (MLD) to find a minimal Euclidean distance between a received symbol chip and an extended symbol basis from the ILUT.

In any of the above embodiments, performing signal compensation further comprises post-compensating the data transmission payload after signal recovery in a receiver by composing received symbols into arrays of symbol chips; applying a maximum likelihood detection (MLD) to find a minimal Euclidean distance between a received symbol chip and an extended symbol basis from the ILUT; and subtracting a corresponding mean error from the ILUT from a second element of the received symbol chip.

In a further embodiment, the transmission link is a coherent optical link using dual-polarization and high baud rate higher-order quadrature amplitude modulation (HB-HO-QAM).

In another aspect, a system for compensating for signal distortion in a data transmission payload sent by a transmitter over a transmission link to a receiver comprising at least one processing element to receiving a sequence of training symbols $S_i$; decomposing each symbol $S_i$ into real-valued in-phase $I_i$ and quadrature $Q_i$ components; composing symbol chips $c_{Ii}$ and $c_{Qi}$ from n consecutive symbols, wherein $c_{Ii}$ comprises n $I_i$ components and at least one $Q'$ component, and wherein $c_{Qi}$ comprises n $Q_i$ components and at least one $I_i$ component; storing symbol chips $c_{Ii}$ in an I branch array and symbol chips $c_{Qi}$ in a Q branch array; processing the I branch array and Q branch array symbol chips to calculate an input-output data map; and performing signal compensation of a data transmission payload using the input-output data map.

In a further embodiment, $C_{Ii}=[I_{i-(n-1)/2}, \ldots, I_i, \ldots, I_{i+(n-1)/2}, Q_i]$, $c_{Qi}=[Q_{i-(n-1)/2}, \ldots, Q_i, \ldots, Q_{i+(n-1)/2}, I_i]$ and n is an odd integer.

In any of the above embodiments, n=3.

In any of the above embodiments, the input-output data map comprises an interweaved look-up table (ILUT) comprising an I look-up table (LUT) and a Q LUT;

In any of the above embodiments, the at least one processing element, for each of the I and Q branches, further processes the I branch array and Q branch array symbol chips by classifying symbol chips of a respective branch array into one of a plurality of clusters $C_k$, each cluster comprising all symbol chips with a minimal Euclidean distance to a kth extended symbol basis; calculating a mean error for each cluster and storing it in the look-up table of the respective branch; and calculating an extended symbol basis and storing it in the look-up table of the respective branch.

In any of the above embodiments, the at least one processing element further pre-compensates the data transmission payload after binary data for transmission is mapped into vector symbols, by clustering the vector symbols into different basis categories using an original-basis list from the ILUT; pre-distorting the clustered symbols by deducing a mean error from a second symbol in each chip and a mean error from the ILUT; and forming the data transmission payload from the pre-distorted symbols.

In any of the above embodiments, the at least one processing element further post-compensates the data transmission payload, by composing received symbols into arrays of symbol chips; and applying a maximum likelihood detection (MLD) to find a minimal Euclidean distance between a received symbol chip and an extended symbol basis from the ILUT.

In any of the above embodiments, the at least one processing element further post-compensates the data transmission payload, by composing received symbols into arrays of symbol chips; applying a maximum likelihood detection (MLD) to find a minimal Euclidean distance between a received symbol chip and an extended symbol basis from the ILUT; and subtracting a corresponding mean error from the ILUT from a second element of the received symbol chip.

In a further embodiment, the transmission link is a coherent optical link.

DETAILED DESCRIPTION OF THE EMBODIMENTS

Figure 1:
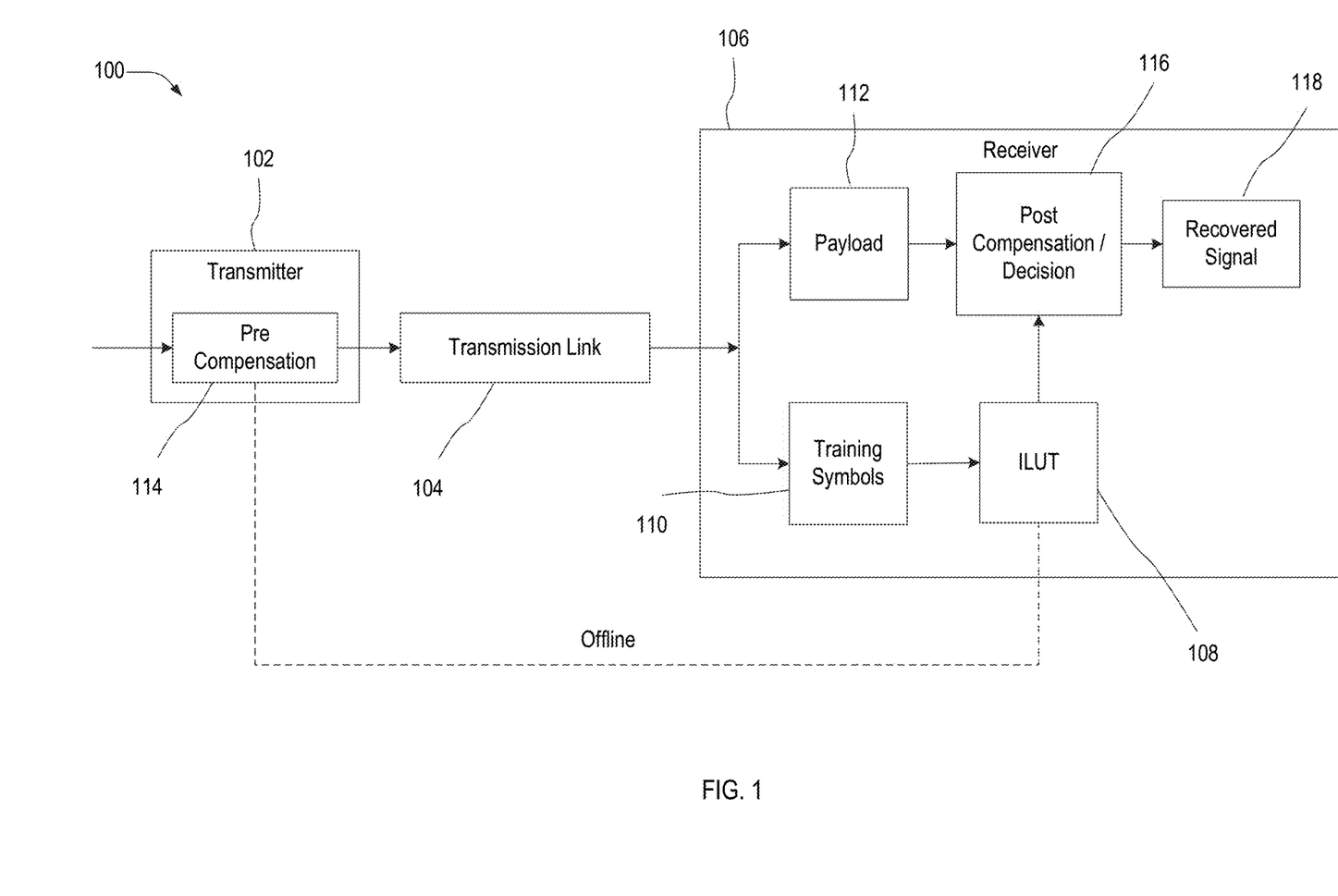
FIG. 1 depicts a flow diagram of a data transmission system incorporating an interweaved look-up table (ILUT), in an embodiment.

In embodiments, a data transmission system 100 incorporating an input/output data map or an interweaved dataset or data array, such as but not limited to an interweaved look-up table (ILUT), is represented in a flow diagram in FIG. 1. A transmitter 102 transmits data signals over a transmission link 104 to a receiver 106. In embodiments, transmission link 104 is a coherent optical link but embodiments disclosed herein may be used with any transmission link that experiences distortion including, for example, wireless, wired and satellite communication links. In addition, embodiments disclosed herein may be used in coherent and non-coherent systems. Data signals are transmitted over transmission link 104 using, for example, quadrature amplitude modulation (QAM). In embodiments, transmission link 104 uses higher-order QAM, such as 64-QAM or 256-QAM. In this modulation format, data signals are transmitted as a sequence of symbols, which may provide greater spectral efficiency and lower power consumption per bit. However, the data signals transmitted may be vulnerable to distortions from a variety of sources. For this reason, data transmission system 100 includes functionality for compensating for distortion in the system. In particular, a sequence of training symbols is sent through transmission link 104 and used to train an ILUT 108, which is then used to compensate for distortion in data payload signals 112. Although embodiments of a coherent optical link both with and without dual-polarization are disclosed herein, ILUT 108 may be used to rectify any two-dimensional signal degradations.

After transmission to receiver 106, received training symbols 110 are extracted and used to calculate ILUT 108. In embodiments, the longer the sequence of training symbols, the more precise the ILUT 108. The training sequence may include, for example, anywhere from hundreds to thousands of symbols. The terms "training sequence" and "payload" do not have a defined relationship in time or quantity. For some transmission link types and distortions, training symbols may be sent infrequently, such as once a day or less. In situations with rapidly changing distortions, training symbols may be sent more frequently, as necessary to respond to changing link circumstances.

There are several methods of using ILUT 108 in signal compensation. One is to pre-compensate 114 the signals at transmitter 102 by adding the inverse of the distortions. Another is to post-compensate 116 the signal at receiver 106 by deducting the estimated distortions, resulting in recovered signal 118.

Figure 2A:
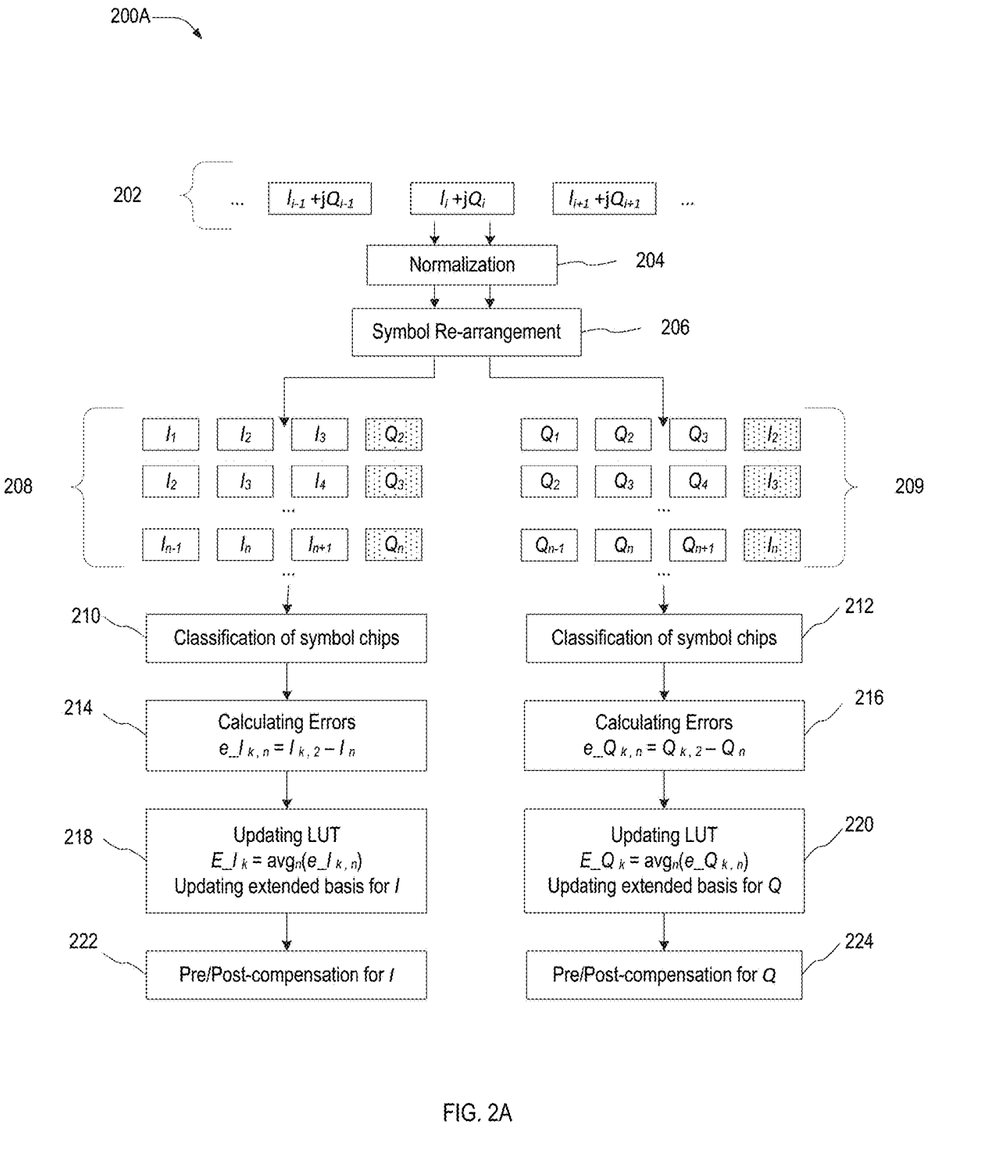
FIG. 2A is a flow diagram of a method of training an ILUT, in an embodiment.

FIG. 2A is a flow diagram illustrating a method 200 of training ILUT 108. A series of training symbols 202 are received at receiver 106. Training symbols 202 have the form $S_i=I_i+jQ_i$ representing a QAM signal, where subscript i indexes and differentiates each training symbol of training symbols 110. FIG. 2 illustrates method 200 for training symbols in an X polarization.

Step 204 includes normalizing training symbols 202. In an example of step 204, training symbols 202 that were processed at different parts of transmission link 104 are normalized to the same unified amplitude reference.

Step 206 includes composing the signal into a matrix of symbol chips according to the extended signal basis in ILUT 108. As used herein "symbol chips" refers generally to a unit or collection of data, not an integrated circuit device manufactured on a substrate such as silicon. To reduce computational complexity, the pre- or post-compensation is only applied to one-dimensional real-valued signals. Symbols $S_i$ decomposed into real-valued coefficients on the dimensions of I and Q, which denote two orthogonal phases. In embodiments, ILUT 108 includes look-up tables for an I branch and a Q branch. In an embodiment, each symbol $S_i$ will be decomposed into real-valued components $I_i$, $Q_i$, where I and Q denote two orthogonal phases. In embodiments, for an M-QAM signal with $\sqrt{M}$ levels in the I or Q branch and the size of the basis as L, the total number of basis in one dimension would be $K=(\sqrt{M})^L$. Embodiments discussed herein refer to 64-QAM where M=64, L=4, and K=4096. These embodiments are for purposes of illustration only and other orders of modulation, and values of K and L, may be used.

In embodiments, an LUT in each branch includes (i) the mean error and (ii) the extended symbol basis. The extended symbol basis is an expansion of an original standard symbol basis $s_k=[S_{k,1}, S_{k,2}, S_{k,3}, S_{k,4}]$ through the incorporation of channel distortions, where k=1:K and $S_{k,i} \in \{-\sqrt{M}+1, -\sqrt{M}+3, \ldots, \sqrt{M}-3, \sqrt{M}-1\}$. In embodiments, the extended symbol basis is calculated from symbol chips composed from the real-valued components $I_i$, $Q_i$, of training symbols 202. A structure of the symbol chip is shown in FIG. 2 at I branch array 208 and Q branch array 209, where each row represents a symbol chip that is stored in the respective array. A symbol chip $c_{Ii}$ and $c_{Qi}$ is composed from n consecutive pulse-amplitude-modulated (PAM) symbols with either I or Q in one polarization and one PAM symbol in the another I/Q branch of the same polarization. The general forms for a symbol chip are $$c_{Ii}=[I_{i-(n-1)/2}, \ldots, I_i, \ldots, I_{i+(n-1)/2}, Q_i] \text{ and} \quad (1)$$

$$c_{Qi}=[Q_{i-(n-1)/2}, \ldots, Q_i, \ldots, Q_{i+(n-1)/2}, I_i] \quad (2)$$

for the I and Q branches, respectively. Although a symbol chip composed of three symbols is illustrated and discussed herein, embodiments are not limited to three symbols. For example, a symbol chip composed from five symbols or any odd number of symbols may be used. For any odd number of symbols, the last coefficient and the center coefficient in the odd number of symbols will correspond to the I and Q components of one original QAM symbol.

Such an interweaved configuration of the symbol chips brings several benefits. For one, it accounts for the memory effect in the residual distortions since adjacent symbols are included in a symbol chip. Additionally, the interweaved configuration takes account of the distortion penalty across I and Q branches since one reference symbol from the opposite I/Q branch is introduced.

Steps 210 and 212 include classification of symbol chips. In an example of steps 210 and 212, after re-arranging the received symbols 202 into arrays of symbol chips 208 and 209, the next step is to classify the chips into different clusters. A cluster, denoted as $C_k$, includes all the symbol chips with the minimal Euclidean distance to the kth Extended Symbol Basis. It is worth noticing that the classification could be blind or with the knowledge from training. When blind classification is used, a decision feedback scheme is needed to update the value of different extend symbol basis.

Steps 214 and 216 include calculating errors between each symbol chip and the original basis. In an example of steps 214 and 216, the errors between the symbol chip and the original basis in the I and Q branches are calculated using the equations (3)-(4):

$$e\_I_{k,l}=S_{k,2}-I_l \quad (3)$$

$$e\_Q_{k,m}=S_{k,2}-Q_m \quad (4)$$

where l, m, p and q are indices into the symbol chips within the cluster.

Steps 218 and 220 include calculating a mean error for each cluster. In an example of steps 218 and 220, the mean error for each cluster is calculated for each cluster using the equations (5)-(6):

$$E\_I_k=\text{mean}_l(e\_I_{k,l}) \quad (5)$$

$$E\_q_k=\text{mean}_m(e\_Q_{k,m}) \quad (6)$$

The kth extended symbol basis of one dimension can be obtained through calculating the vector average for all the symbol chips contained by the kth cluster in the same dimension using equations (7)-(8):

$$[\hat{S}_{k,1}, \hat{S}_{k,2}, \hat{S}_{k,3}, \hat{S}_{k,4}]_I = \text{mean}_{c_I \in C_k}(c_I) \quad (7)$$

$$[\hat{S}_{k,1}, \hat{S}_{k,2}, \hat{S}_{k,3}, \hat{S}_{k,4}]_Q = \text{mean}_{c_Q \in C_k}(c_Q) \quad (8)$$

Based on the above calculations, ILUT 108 includes a look-up table (LUT) for each of the I and Q branches which maps one mean error and one extended symbol basis to one original basis. ILUT 108 may be used to perform signal compensation on a data transmission payload. It may be used pre-compensate the payload by deducing the mean error from the distorted symbol chips or post-compensate the payload through mapping the received distorted symbol chips back to the original symbol basis.

Figure 2B:
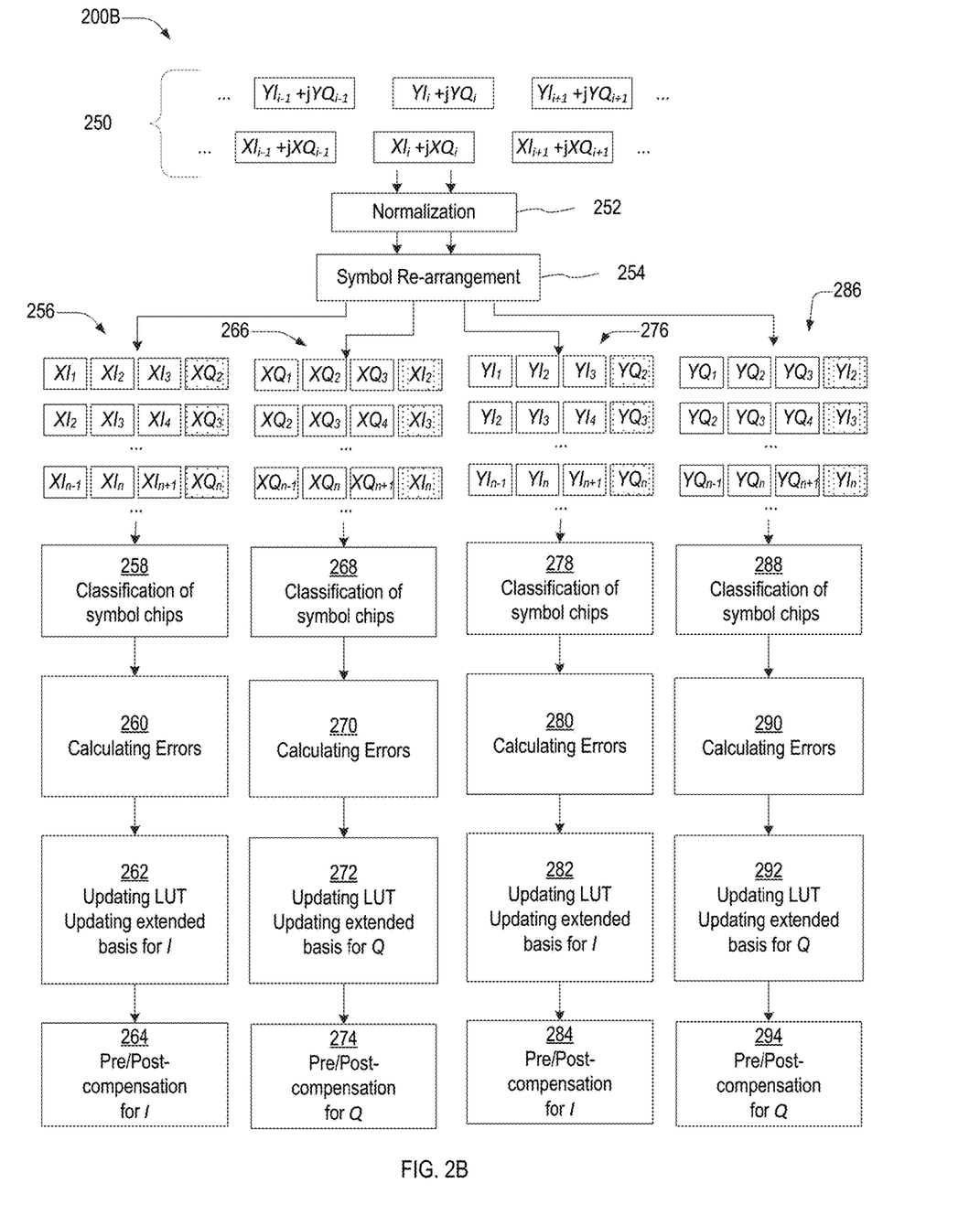
FIG. 2B is a flow diagram of a method of training an ILUT in a dual-polarization transmission link, in an embodiment.

In embodiments, system 100 may be use dual polarization Symbols 250 as shown in FIG. 2B are $S_{Xi}=XI_i+jXQ_i$ and $S_{Yi}=YI_i+jYQ_i$. FIG. 2B illustrates method 200B for training an ILUT 108 in a dual polarization system.

FIG. 2B is a flow diagram illustrating a method 200B of training ILUT 108 in a dual polarization system. A series of training symbols 250 are received at receiver 106. Training symbols 250 have the form are $S_{Xi}=XI_i+jXQ_i$ and $S_{Yi}=YI_i+jYQ_i$, representing a QAM signal, where subscript i indexes and differentiates each training symbol of training symbols 250.

Step 252 includes normalizing training symbols 250. In an example of step 252, training symbols 250 that were processed at different parts of transmission link 104 are normalized to the same unified amplitude reference.

Step 254 includes re-arranging the signal into a matrix of symbol chips according to the extended signal basis in ILUT 108. To reduce computational complexity, the pre- or post-compensation is only applied to one-dimensional real-valued signals. As noted above, embodiments disclosed herein may be used with coherent or non-coherent systems, and with single or dual polarization. For purposes of illustration, a coherent dual-polarization system is not described. Training symbols 250 are decomposed in to four real-valued coefficients on the dimensions of XI, XQ, YI, and YQ, where X and Y denote two orthogonal polarizations; I and Q denote two orthogonal phases. In embodiments, an M-QAM signal with $\sqrt{M}$ levels in the I or Q tributary and the size of the basis as L, the total number of basis in one dimension would be $K=(\sqrt{M})^L$. In total, a dual polarization format includes four LUTs covering XI, XQ, YI, and YQ and each LUT contains K units. Embodiments discussed herein refer to 64-QAM where M=64, L=4, and K=4096. These embodiments are for purposes of illustration only and other orders of modulation, and values of K and L, may be used.

In embodiments, an LUT in each tributary includes (i) the mean error and (ii) the extended symbol basis. The extended symbol basis is an expansion of an original standard symbol basis $s_k=[S_{k,1}, S_{k,2}, S_{k,3}, S_{k,4}]$ through the incorporation of channel distortions, where k=1: K and $S_{k,i} \in \{-\sqrt{M}+1, -\sqrt{M}+3, \ldots, \sqrt{M}-3, \sqrt{M}-1\}$. In embodiments, the extended symbol basis is calculated from symbol chips composed from the real-valued components $XI_i$, $XQ_i$, $YI_i$ and $YQ_i$ of training symbols 250. A structure of the symbol chip is shown in FIG. 2B at XI branch array 256, XQ branch array 266, YI branch array 276 and YQ branch array 286, where each row represents a symbol chip that is stored in the respective array. As discussed above for FIG. 2A, each symbol chip is composed of n consecutive pulse-amplitude-modulated (PAM) symbols with either I or Q in one polarization and one PAM symbol in the another I/Q tributary of the same polarization. The general forms for a symbol chip are $$c_{XI}=[XI_{i-(n-1)/2}, \ldots, XI_i, \ldots, XI_{i+(n-1)/2}, XQ_i], \quad (9)$$

$$c_{XQ}=[XQ_{i-(n-1)/2}, \ldots, XQ_i, \ldots, XQ_{i+(n-1)/2}, XI_i], \quad (10)$$

$$c_{YI}=[YI_{i-(n-1)/2}, \ldots, YI_i, \ldots, YI_{i+(n-1)/2}, YQ_i] \text{ and} \quad (11)$$

$$c_{YQ}=[YQ_{i-(n-1)/2}, \ldots, YQ_i, \ldots, YQ_{i+(n-1)/2}, YI_i]. \quad (12)$$

for signals distributed on XI, XQ, YI, and YQ branches, respectively. Although a symbol chip composed of three symbols is illustrated and discussed herein, embodiments are not limited to three symbols. For example, a symbol chip composed from five symbols or any odd number of symbols may be used. For any odd number of symbols, the last coefficient and the center coefficient in the odd number of symbols will correspond to the I and Q components of one original QAM symbol.

Such an interweaved configuration of the symbol chips brings several benefits. For one, it accounts for the memory effect in the residual distortions since adjacent symbols are included in a symbol chip. Additionally, the interweaved configuration takes account of the distortion penalty across I and Q tributaries since one reference symbol from the opposite I/Q tributary is introduced.

Steps 258, 268, 278 and 288 include classification of symbol chips. In an example of steps 258, 268, 278 and 288, after re-arranging the received symbols 250 into arrays 256, 266, 276 and 286 of symbol chips, the next step is to classify the chips into different clusters. A cluster, denoted as $C_k$, includes all the symbol chips with the minimal Euclidean distance to the kth Extended Symbol Basis. It is worth noticing that the classification could be blind or with the knowledge from training. When blind classification is used, a decision feedback scheme is needed to update the value of different extend symbol basis.

Steps 260, 270, 280 and 290 include calculating errors between each symbol chip and the original basis. In an example of steps 260, 270, 280 and 290, the errors between the symbol chip and the original basis in the dimensions of XI, XQ, YI, and YQ are calculated using the equations (13)-(16):

$$e\_XI_{k,l}=S_{k,2}-XI_l \quad (13)$$

$$e\_XQ_{k,m}=S_{k,2}-XQ_m \quad (14)$$

$$e\_YI_{k,p}=S_{k,2}-YI_p \quad (15)$$

$$e\_YQ_{k,q}=S_{k,2}-YQ_q. \quad (16)$$

where l, m, p and q are indices into the symbol chips within the cluster.

Steps 218 and 220 include calculating a mean error for each cluster. In an example of steps 218 and 220, the mean error for each cluster is calculated for each cluster using the equations (17)-(20):

$$E\_XI_k=\text{mean}_l(e\_XI_{k,l}) \quad (17)$$

$$E\_XQ_k=\text{mean}_m(e\_XQ_{k,m}) \quad (18)$$

$$E\_YI_k=\text{mean}_p(e\_YI_{k,p}) \quad (19)$$

$$E\_YQ_k=\text{mean}_q(e\_YQ_{k,q}) \quad (20)$$

The kth extended symbol basis of one dimension can be obtained through calculating the vector average for all the symbol chips contained by the kth cluster in the same dimension using equations (21)-(24):

$$\left[\hat{S}_{k,1}, \hat{S}_{k,2}, \hat{S}_{k,3}, \hat{S}_{k,4}\right]_{XI} = \text{mean}_{c_{XI} \in C_k}(c_{XI}) \quad (21)$$

$$\left[\hat{S}_{k,1}, \hat{S}_{k,2}, \hat{S}_{k,3}, \hat{S}_{k,4}\right]_{XQ} = \text{mean}_{c_{XQ} \in C_k}(c_{XQ}) \quad (22)$$

$$\left[\hat{S}_{k,1}, \hat{S}_{k,2}, \hat{S}_{k,3}, \hat{S}_{k,4}\right]_{YI} = \text{mean}_{c_{YI} \in C_k}(c_{YI}) \quad (23)$$

$$\left[\hat{S}_{k,1}, \hat{S}_{k,2}, \hat{S}_{k,3}, \hat{S}_{k,4}\right]_{YQ} = \text{mean}_{c_{YQ} \in C_k}(c_{YQ}) \quad (24)$$

Based on the above calculations, ILUT 108 includes a look-up table (LUT) for each tributary which maps one mean error and one extended symbol basis to one original basis. The ILUT 108 may be used to perform signal compensation on a data transmission payload. It may be used pre-compensate the payload by deducing the mean error from the distorted symbol chips or post-compensate the payload through mapping the received distorted symbol chips back to the original symbol basis.

Figure 3A:
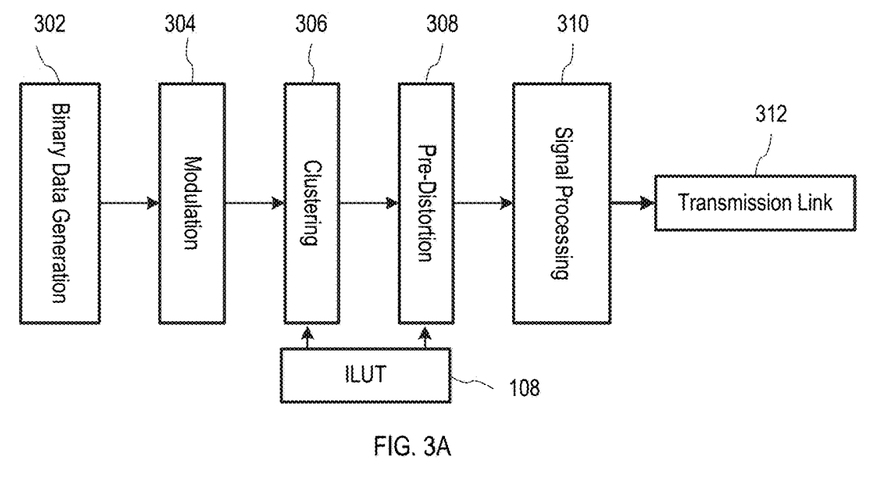
FIG. 3A is a block diagram of an implementation of an ILUT for signal pre-compensation, in embodiments.
Figure 3B:
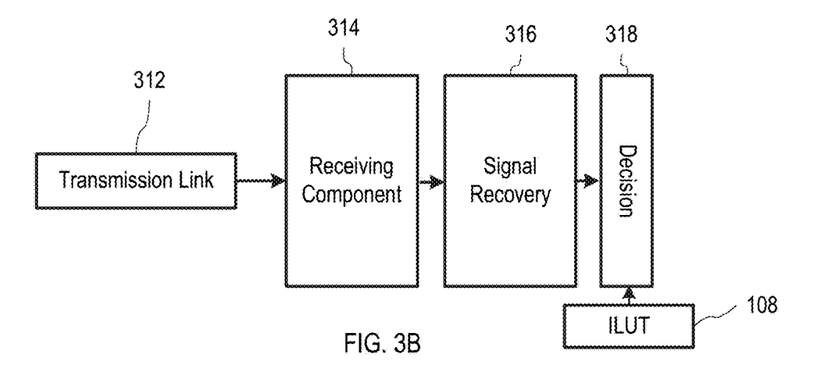
FIGS. 3b-3C are block diagrams of an implementation of an ILUT for signal post-compensation, in embodiments.
Figure 3C:
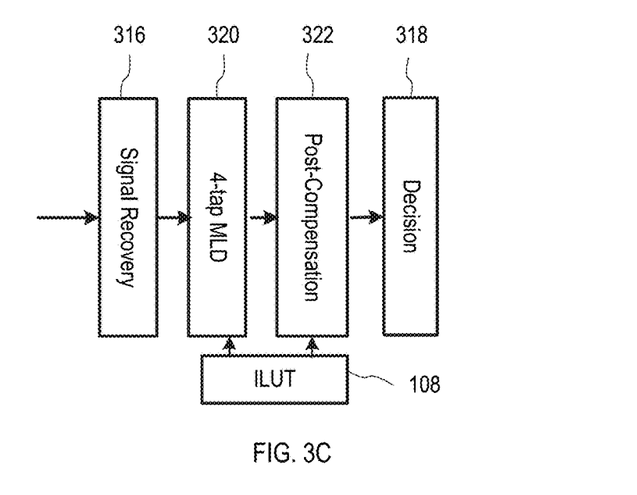

FIGS. 3A-3C are block diagrams of an implementation of ILUT 108 module for signal pre- and post-compensations in coherent signal generation and recovery procedures. Although specific components are shown, these are for purposes of illustration and similar components that accomplish the transmission and reception of data over a transmission link may be used. Although various components are shown as separate blocks, this is not limiting and some or all components may be combined into fewer or separated into components. In embodiments, the block diagrams of FIGS. 3A-3C may be implemented in one or more processing elements, one or more digital signal processors adapted to execute instructions stored in a non-transitory computer readable medium to perform the methods disclosed herein. In further embodiments, any of the methods and processes described herein may also be performed in a chip-level device, such as an ASIC (application-specific integrated circuit) or an FPGA (field-programmable gate array), for example.

FIG. 3A is a block diagram of a representative signal generation apparatus in, for example, transmitter 102. Binary data generation component 302 provides binary data for transmission over transmission link 312, which is mapped into vector symbols in a modulation component 304. In embodiments, pre-compensation is performed using components 306 and 308. Clustering component 306 clusters the vector symbol chips into different basis categories using the original-basis list provided by the ILUT 108. Pre-distortion component 308 adjusts the coefficients of each symbol chip by deducing the mean error from every second symbol in each chip, where the mean error is accessed from ILUT 108. Pre-distorted symbols are further processed by representative component 310 before being sent over transmission link 312. As explained above, embodiments disclosed herein are not limited a particular transmission medium or format.

FIG. 3B is a block diagram of a representative signal recovery apparatus in, for example, receiver 106. Receiving component 314 receives a signal from transmission link 312. Depending on the type of transmission link, the received signal is further processed to recover the signal by component 316. Following signal recovery, the received symbols are arranged into an array of chips and sent to decision stage 318. Decision stage 318 includes a 4-tap maximum likelihood sequence detector (MLSD) that executes a maximum likelihood detection (MLD) algorithm to find the minimal Euclidean distance between the received symbol chip and extended symbol basis. The list of extended symbol basis may be provided by ILUT 108.

In embodiments, 4-tap MLSD 320 may also be used as a pre-decision stage in a decision feed-forward signal post compensation as shown in FIG. 3C. After signal recovery component 316, MLSD 320 executes MLD algorithm to find the minimal Euclidean distance between the received symbol chip and extended symbol basis as a pre-decision, then the corresponding mean error listed in ILUT 108 is deducted from the second element of each symbol chip in post-compensation component 322 before it is sent to final decision stage 318. Compared with ILUT enhanced decisioning, ILUT assisted post-compensation has a higher computational complexity but it may be used in scenarios where constellations have to be used such as error vector magnitude (EVM) evaluation and strength of distortion estimation.

In a coherent optical system, because of the blind DSP and disturbance from phase noise, signal recovery penalties may be stronger than in intensity-modulation and direct detection schemes. In many cases, there are some residual distortions on the symbols, so the ILUT 108 is provided to remove these distortions. Unlike an LUT that includes coefficients from only one tributary and thus, only compensates for one-dimensional distortions, the system and method disclosed herein combines the symbols from both I and Q tributaries, so it can be used to rectify two-dimensional signal degradations. A transmission link may be subject to many different types of distortions, and these result in different unique distribution patterns of the errors. FIGS. 4A-4D are graphs illustrating representative mean-error distribution patterns while using ILUT 108. A 64-QAM modulation format is applied and the signal-to-noise ratio is set around 25 dB. For the nonlinear distortions, a sinusoidal shape transfer function $S_{out}=\sin(0.6\ S_{in})$ is introduced in both I and Q dimensions. IQ imbalance is introduced as $$S_{out} = \text{real}(S_{in}) + j\alpha \times \text{imag}(S_{in}), \quad (25)$$

where $\alpha=0.8$ is the imbalance coefficient. The quadrature error is introduced as $$S_{out} = S_{out} - \frac{d}{2}(1+j)[\text{real}(S_{in}) + \text{imag}(S_{in})], \quad (26)$$

where $d=0.2$ is the quadrature mismatch coefficient.

Figure 4A:
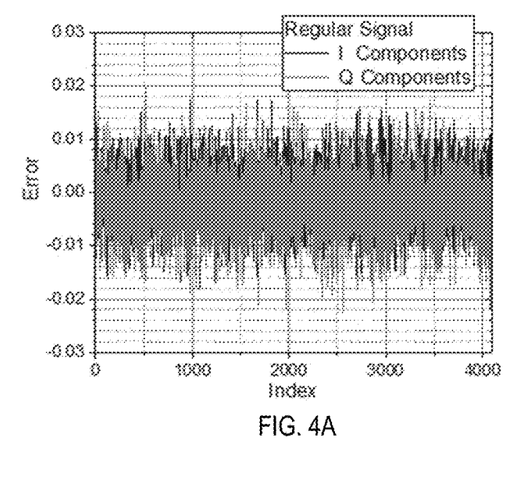
FIGS. 4A-4D are graphs illustrating representative mean-error distribution patterns using an ILUT.
Figure 4B:
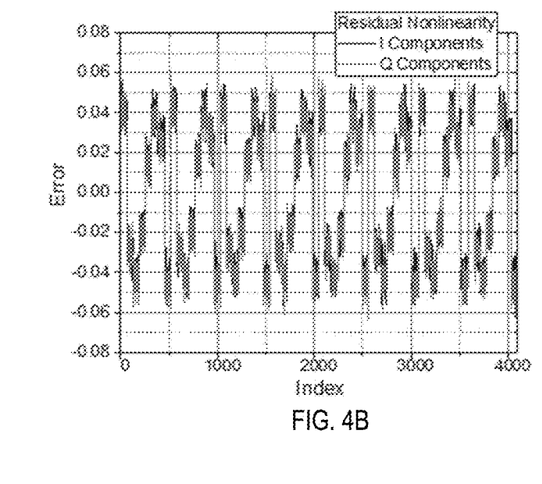
Figure 4C:
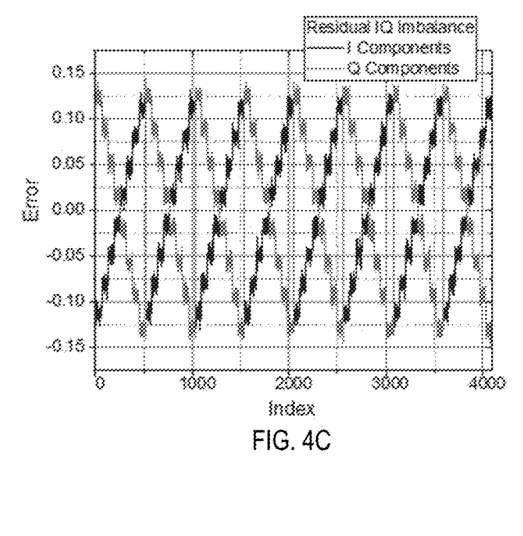
Figure 4D:
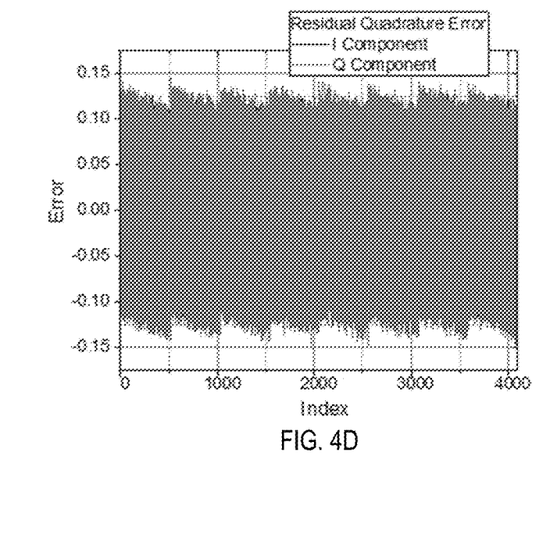
Figure 5A:
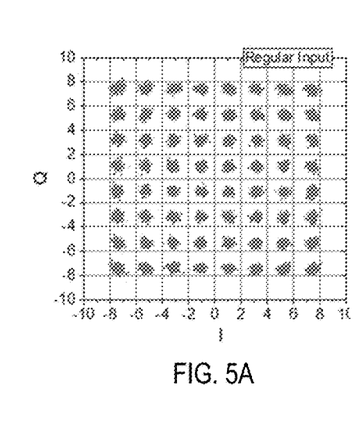
FIGS. 5A-5H illustrate symbol constellations that have experienced various types of distortion and corresponding rectified symbol constellation after compensation using an ILUT.
Figure 5B:
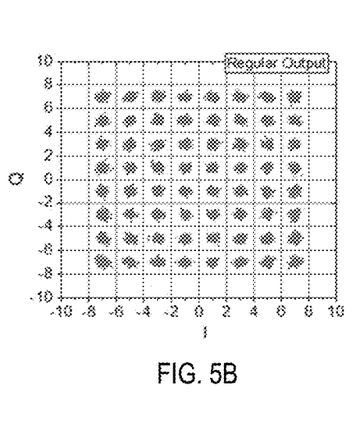
Figure 5C:
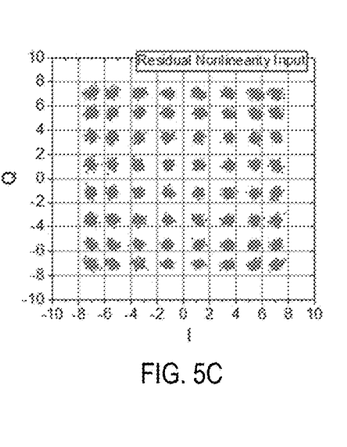
Figure 5D:
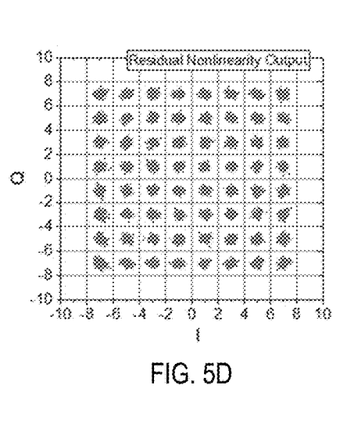
Figure 5E:
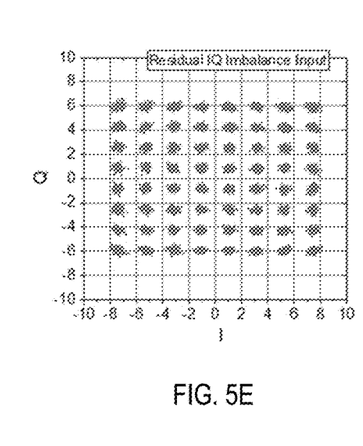
Figure 5F:
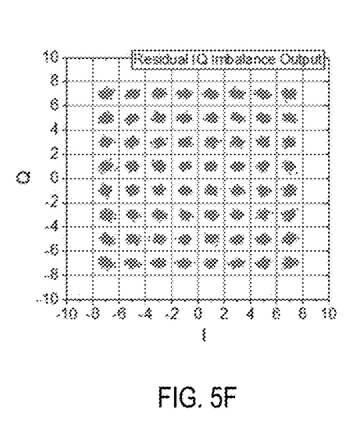
Figure 5G:
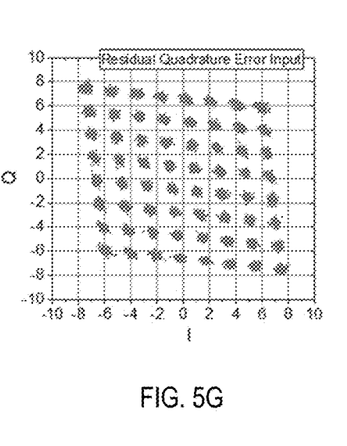
Figure 5H:
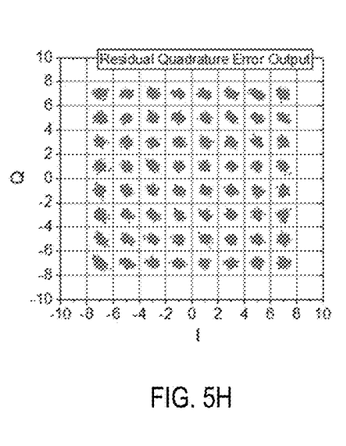
Figure 6A:
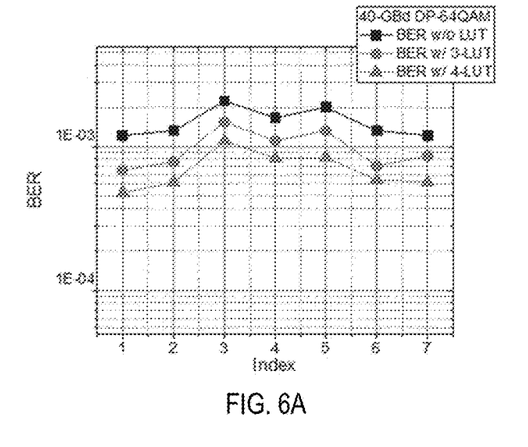
FIGS. 6A-6D are graphs illustrating post compensation using an ILUT, in embodiments.
Figure 6B:
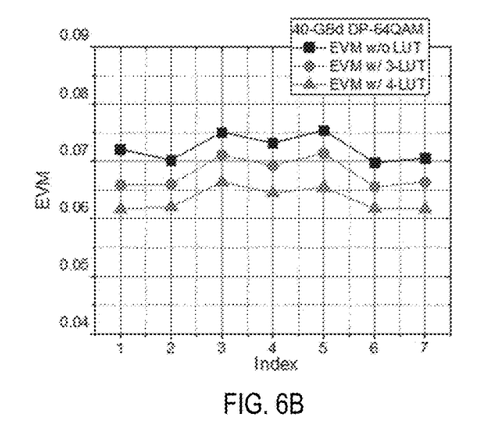
Figure 6C:
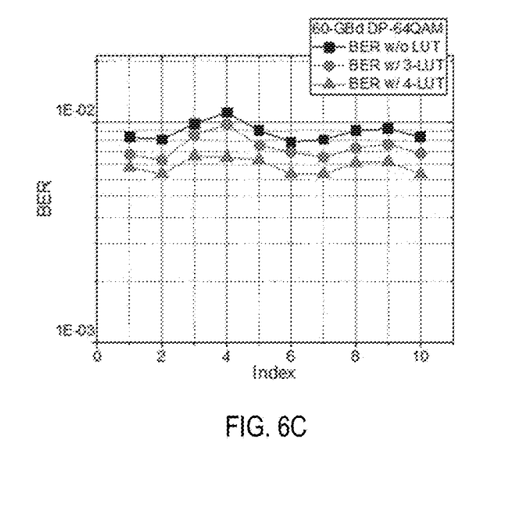
Figure 6D:
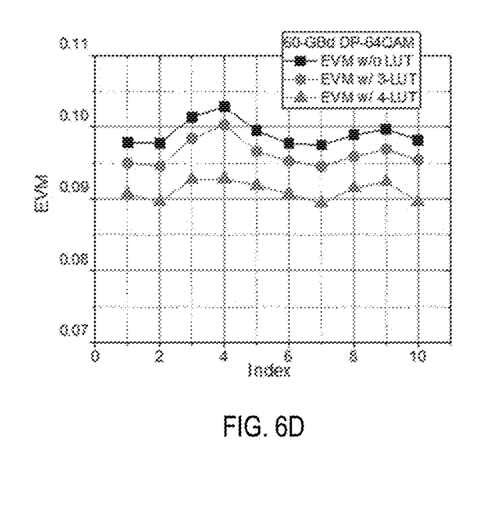

The mean-error distributions versus index for the regular signals without distortions is shown in FIG. 4A. The mean-error distributions under the influence of nonlinear distortions, IQ imbalance, and quadrature error are shown in FIGS. 4B-4D, respectively, where periodic patterns on the mean-error distributions are observed. In embodiments, the unique distributions of the mean errors under the influence of different factors are evaluated using machine learning algorithms to recognize and quantize the various channel penalties. This information may be used to evaluate the system performance and proactively impose corresponding pre-distortion or post-distortion techniques at the transmitter or receiver site respectively.

ILUT 108 is effective to restore symbol constellations from two dimensional distortions. FIGS. 5A, 5C, 5E and 5G illustrate signal constellations in a 64-QAM modulation scheme that are affected by residual inter-symbol interference, nonlinear distortions, IQ imbalance, and quadrature error, respectively. The rectified constellations after applying ILUT post compensation as shown in FIG. 3C are also displayed in FIGS. 5B, 5D, 5F and 5H, respectively. These figures show that the distorted constellations of FIGS. 5A, 5C, 5E and 5G have been transformed into clear and balanced constellations using ILUT 108.

FIGS. 6A-6D are graphs illustrating post compensation using ILUT 108. Received data captured from an optical modulation analyzer in dual-polarization 64-QAM systems suffered from residual channel distortions. The graphs in FIGS. 6A-6D plot bit-error rates (BER) at baud rates of 4-GBd and 60-GBd. BER without using an LUT is shown with square data points. BER with a prior art LUT-based method with a 3-tap memory depth is shown with circle data points. BER with 4-tap ILUT 108 as disclosed herein is shown with triangle data points. It can be observed that, for both bit-error rates (BER) and error-vector magnitude (EVM), 4-tap ILUT 108 performs better than the 3-tap LUT. There could be several reasons for this result. For one, 4-tap ILUT 108 greatly expands the possible scenarios of data combinations. Additionally, by interweaving the symbols from the opposite I/Q components, the performance is better against two-dimensional distortions including nonlinear effect, IQ imbalance, and quadrature errors.

Changes may be made in the above methods and systems without departing from the scope hereof. For example, various methods and systems disclosed herein may incorporate machine learning or neural networks. It should thus be noted that the matter contained in the above description or shown in the accompanying drawings should be interpreted as illustrative and not in a limiting sense. Herein, and unless otherwise indicated: (a) the adjective "exemplary" means serving as an example, instance, or illustration, and (b) the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A method of compensating for signal distortion in a data transmission payload sent over a transmission link, the method comprising:

receiving a sequence of training symbols $S_i$;

decomposing each symbol $S_i$ into real-valued in-phase $I_i$ and quadrature $Q_i$ components;

composing symbol chips $c_{Ii}$ and $c_{Qi}$ from n consecutive symbols, wherein:

the symbol chips $c_{Ii}$ comprises n $I_i$ components and at least one $Q_i$ component, the symbol chips $c_{Qi}$ comprises n $Q_i$ components and at least one $I_i$ component, and n is an integer;

storing the symbol chips $c_{Ii}$ in an I branch array and the symbol chips $c_{Qi}$ in a Q branch array;

processing the I branch array and Q branch array symbol chips to calculate an input-output data map; and performing signal compensation of the data transmission payload using the input-output data map.

2. The method of claim 1, wherein
$c_{Ii}=[I_{i-(n-1)/2}, \ldots, I_i, \ldots, I_{i+(n-1)/2}, Q_i]$,
$c_{Qi}=[Q_{i-(n-1)/2}, \ldots, Q_i, \ldots, Q_{i+(n-1)/2}, I_i]$ and n is an odd integer.

3. The method of claim 2, wherein n=3.

4. The method of claim 1, wherein the input-output data map comprises an interweaved look-up table (ILUT) comprising an I look-up table (LUT) and a Q look-up table (LUT).

5. The method of claim 4, wherein the transmission link uses dual polarization, I and Q denote orthogonal phases and X and Y denote orthogonal polarizations, and wherein the ILUT comprises an XI LUT, an XQ LUT, a YI LUT and a YQ LUT.

6. The method of claim 5, wherein $c_{XI}$, $c_{XQ}$, and $c_{YQ}$ symbol chips are composed from n consecutive symbols, wherein
$c_{XI}=[XI_{i-(n-1)/2}, \ldots, XI_i, \ldots, XI_{i+(n-1)/2}, XQ_i]$,
$c_{XQ}=[XQ_{i-(n-1)/2}, \ldots, XQ_i, \ldots, XQ_{i+(n-1)/2}, XI_i]$,
$c_{YI}=[YI_{i-(n-1)/2}, \ldots, YI_i, \ldots, YI_{i+(n-1)/2}, YQ_i]$ and
$c_{YQ}=[YQ_{i-(n-1)/2}, \ldots, YQ_i, \ldots, YQ_{i+(n-1)/2}, YI_i]$.

7. The method of claim 4, wherein processing the symbol chips further comprises, for the I branch array:
classifying the I branch array symbol chips into one of a plurality of I branch array clusters $C_{kI}$, each cluster $C_{kI}$ comprising all I branch array symbol chips with a minimal Euclidean distance to a kth extended symbol basis, calculating an I branch mean error for each cluster $C_{kI}$ and storing the I branch mean error in the I look-up table, and calculating an I branch extended symbol basis and storing the I Branch extended symbol basis in the I look-up table; and for the Q branch array:
classifying the Q branch array symbol chips into one of a plurality of Q branch array clusters $C_{kQ}$, each cluster $C_{kQ}$, comprising all of the Q branch array symbol chips with a minimal Euclidean distance to a kth extended symbol basis, calculating a Q branch mean error for each cluster $C_{kQ}$ and storing the Q branch mean error in the Q look-up table, and calculating a Q branch extended symbol basis and storing the Q branch extended symbol basis in the Q look-up table.

8. The method of claim 4, wherein the performing the signal compensation further comprises pre-compensating the data transmission payload after binary data for transmission is mapped into vector symbols by:

clustering the vector symbols into different basis categories using an original-basis list from the ILUT;

pre-distorting the clustered symbols by deducing a mean error from a second symbol in each symbol chip and a mean error from the ILUT; and forming the data transmission payload from the pre-distorted symbols.

9. The method of claim 4, wherein the performing the signal compensation further comprises compensating for signal distortion in a decision stage of a receiver by:

composing received symbols into arrays of symbol chips; and applying a maximum likelihood detection (MLD) to find a minimal Euclidean distance between a received symbol chip and an extended symbol basis from the ILUT.

10. The method of claim 4, wherein the performing the signal compensation further comprises post-compensating the data transmission payload after signal recovery in a receiver by:

composing received symbols into arrays of symbol chips;

applying a maximum likelihood detection (MLD) to find a minimal Euclidean distance between a received symbol chip and an extended symbol basis from the ILUT; and subtracting a corresponding mean error from the ILUT from a second element of the received symbol chip.

11. The method of claim 1, wherein the transmission link is a coherent optical link using dual-polarization and high baud rate higher-order quadrature amplitude modulation (HB-HO-QAM).

12. A system for compensating for signal distortion in a data transmission payload sent by a transmitter over a transmission link to a receiver comprising at least one processing element to:

receive a sequence of training symbols $S_i$;

decompose each symbol $S_i$ into real-valued in-phase $I_i$ and quadrature $Q_i$ components;

compose symbol chips $c_{Ii}$ and $c_{Qi}$ from n consecutive symbols, wherein:
the symbol chips $c_{Ii}$ comprises n $I_i$ components and at least one $Q_i$ component,
the symbol chips $c_{Qi}$ comprises n $Q_i$ components and at least one $I_i$ component
n is an integer;

store the symbol chips $c_{Ii}$ in an I branch array and the symbol chips $c_{Qi}$ in a Q branch array;

process the I branch array and Q branch array symbol chips to calculate an input-output data map; and perform signal compensation of the data transmission payload using the input-output data map.

13. The system of claim 12, wherein $c_{Ii}=[I_{i-(n-1)/2}, \ldots, I_i, \ldots, I_{i+(n-1)/2}, Q_i]$,
$c_{Qi}=[Q_{i-(n-1)/2}, \ldots, Q_i, \ldots, Q_{i+(n-1)/2}, I_i]$ and n is an odd integer.

14. The system of claim 13, wherein n=3.

15. The system of claim 12, wherein the input-output data map comprises an interweaved look-up table (ILUT) comprising an I look-up table (LUT) and a Q look-up table (LUT).

16. The system of claim 15, wherein the at least one processing element, for each of the I and Q branch arrays, further processes the I branch array and Q branch array symbol chips by:

for the I branch array:
classifying the I branch array symbol chips into one of a plurality of I branch array clusters $C_{kI}$, each cluster $C_{kI}$ comprising all I branch array symbol chips with a minimal Euclidean distance to a kth extended symbol basis, calculating an I branch mean error for each cluster $C_{kI}$ and storing the I branch mean error in the I look-up table, and calculating an I branch extended symbol basis and storing the I branch extended symbol basis in the I look-up table; and for the Q branch array:

classifying the Q branch array symbol chips into one of a plurality of Q branch array clusters $C_{kQ}$, each cluster $C_{kQ}$ comprising all of the Q branch array symbol chips with a minimal Euclidean distance to a kth extended symbol basis, calculating a Q branch mean error for each cluster $C_{kQ}$ and storing the Q branch mean error in the Q look-up table, and calculating a Q branch extended symbol basis and storing the Q Branch extended symbol basis in the Q look-up table.

17. The system of claim 15, wherein the at least one processing element further pre-compensates the data transmission payload after binary data for transmission is mapped into vector symbols, by:

clustering the vector symbols into different basis categories using an original-basis list from the ILUT;

pre-distorting the clustered symbols by deducing a mean error from a second symbol in each symbol chip and a mean error from the ILUT; and forming the data transmission payload from the pre-distorted symbols.

18. The system of claim 15, wherein the at least one processing element further post-compensates the data transmission payload, by:

composing received symbols into arrays of symbol chips; and applying a maximum likelihood detection (MLD) to find a minimal Euclidean distance between a received symbol chip and an extended symbol basis from the ILUT.

19. The system of claim 15, wherein the at least one processing element further post-compensates the data transmission payload, by:

composing received symbols into arrays of symbol chips;

applying a maximum likelihood detection (MLD) to find a minimal Euclidean distance between a received symbol chip and an extended symbol basis from the ILUT; and subtracting a corresponding mean error from the ILUT from a second element of the received symbol chip.

20. The system of claim 12, wherein the transmission link is a coherent optical link.

* * * * *